United States Patent [19]

Hauck

[11] Patent Number: 5,179,648
[45] Date of Patent: Jan. 12, 1993

[54] COMPUTER AUXILIARY VIEWING SYSTEM

[76] Inventor: Lane T. Hauck, 5346 Bragg St., San Diego, Calif. 92122

[21] Appl. No.: 646,091

[22] Filed: Jan. 25, 1991

Related U.S. Application Data

[63] Continuation of Ser. No. 370,647, Jun. 22, 1989, abandoned, which is a continuation of Ser. No. 843,017, Mar. 24, 1986, abandoned.

[51] Int. Cl.$^5$ .............................................. G06F 15/62
[52] U.S. Cl. .................................... 395/145; 340/706; 364/174; 364/188
[58] Field of Search ............... 364/518, 521, 174, 188, 364/190; 340/747, 750, 731, 706; 395/133, 138, 145

[56] References Cited

U.S. PATENT DOCUMENTS

| | | | |
|---|---|---|---|
| 4,561,049 | 12/1985 | Deleganus et al. | 364/130 |
| 4,801,854 | 1/1989 | Conrah | 318/305 |
| 4,859,922 | 8/1989 | Tauchenitz et al. | 318/628 |
| 5,115,509 | 5/1992 | Kahler | 395/775 |

Primary Examiner—Gary V. Harkcom
Assistant Examiner—Phu K. Nguyen
Attorney, Agent, or Firm—Bernard L. Kleinke; Jerry R. Potts; William Patrick Waters

[57] ABSTRACT

A computer auxiliary viewing system that enables a rapid review of previously entered information, in a similar manner to the retrieval of information using a microfiche reader so that by the simple manual turning of a control knob, all previously entered data can be scrolled for review on a screen. The system includes videographics generating devices responsive to stored information signals in buffer devices for causing the reproduction of the desired scrolling image, and control devices for retrieving selectively the stored information signals in the buffer devices to cause the generation of the image signals by an auxiliary monitor device, independently of information signals being transferred from the input device to the computer processor unit.

18 Claims, 6 Drawing Sheets

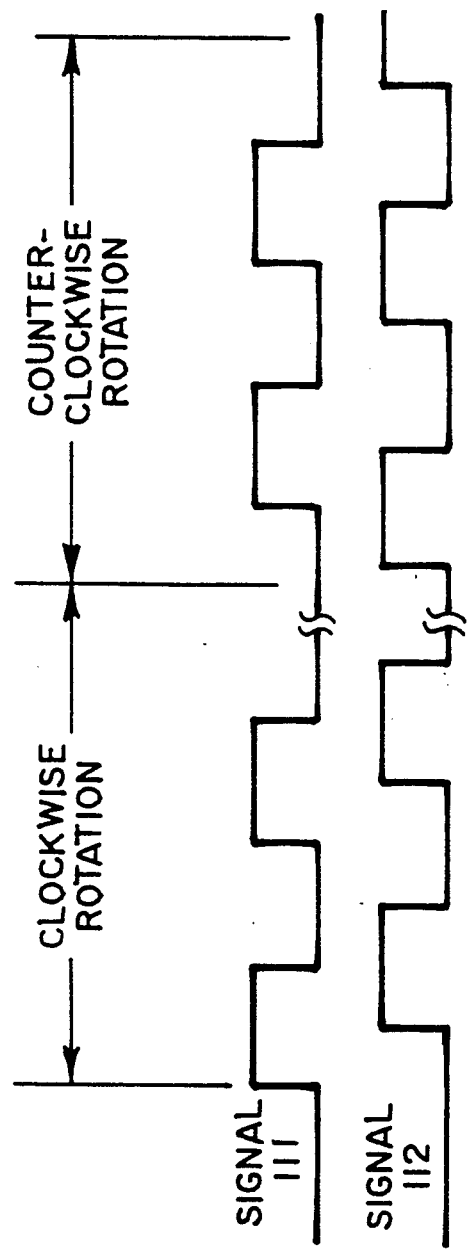

COMPUTER AUXILIARY VIEWING SYSTEM

This is a continuation of application Ser. No. 07/370,647, filed on Jun. 22, 1989, now abandoned, which is a continuation of Ser. No. 07/843,017 filed Mar. 24, 1986, now abandoned.

TECHNICAL FIELD

The present invention relates in general to a computer auxiliary viewing system, and more particularly relates to an auxiliary monitor for use with a personal computer.

BACKGROUND ART

There have been many different types and kinds of personal computers that include a computer processor unit, a keyboard input device, a video monitor, and peripheral devices, such as printers. While such personal computers have become popular and are widely used, it would be highly desirable to enable the user to review quickly all input data to the computer processor unit, in as rapid a manner as possible. For example, when computer programs are composed, a computer programmer ordinarily causes a paper copy of the coded listing of commands to be printed out, before going over them. Therefore, it would be highly desirable to have a technique for accessing such previously entered information electronically in a very quick and simple manner, without the necessity of having to refer to a listing printed on paper.

Various computer programs are often used throughout the day on a personal computer, for processing information—both text and data. It would be highly desirable to view on a screen all information, regardless of the applications program used to enter the data over a particular period of time, such as an eight hour interval. In this respect, it would be desirable to have an arrangement enabling a user to review the day's work rapidly in order to observe and then retrieve particular portions of data, without the problems commonly associated with doing so.

Consider, for example, some common existing information retrieval problems. For a given applications program, computers often presents previously entered text to the operator, as rapidly scrolled data that disappears off the top of the screen. Recall of the text usually involves specific keyboard operations that are inconvenient and somewhat time consuming.

It is difficult to read information that extends beyond one display screen, since part of the information disappears off the top of the screen to make room for the remaining data.

Moreover, most display screens on personal computers (e.g., the IBM PC) display a scroll of one line of data or text at a time, making it difficult to read as it scrolls.

In a word processing application program, much printer paper is wasted because the user of a word processor program often performs lengthy printouts, only to find that the page breaks in the document did not occur exactly where they were desired, and thus the operation must be repeated.

It is often necessary to print out only a selected portion of a document prepared on a computer. Some, but not all, word processor programs have this capability, but the capability is present only if the word processor program is executing. It would be much more convenient to have this capability no matter what program was executing.

It is often desirable to view a portion of one document simultaneously with a portion of another document, or two portions of the same document, for comparison purposes. Although this feature is available in some word processor programs, it is not generally available in many other programs. Thus, it would be highly desirable to have simultaneous view capability for all programs being executed, even if the programs themselves are not designed to provide such simultaneous viewing features.

Certain software development methods require that the programmer make a printed listing to allow correlation of diagnostic information appearing on the computer screen with the program listing. The printout is often time consuming, and its results are only of transient value. Hence, fast viewing of data previously entered or displayed, would be highly advantageous.

Some computer programs run lengthy data reduction tasks, and display error messages on the computer screen. If the error messages fill the screen, they usually scroll off the top, and are missed unless the operator watches the screen during the entire data reduction process. Even then, the messages might scroll off the screen too rapidly to be read. It would be preferable to allow the computer program to run unattended, and then be able to easily recall the error messages, even if they occupied many screens of information.

When learning to operate a new computer program, a novice user is often confused by what is happening because he cannot remember what he typed as commands, or what prompts were given by the program earlier in the session. For this reason, it would be highly beneficial to a user, to be able to view all previously entered and displayed data, even though several application programs were employed, in a fast and convenient manner.

When reviewing data received "on-line" from a modem, it is often cumbersome to find desired sections of the text by using the editing program provided by the telecommunications software (if editing capability is provided at all). Thus, the ability to view previously received text or data in a rapid, "user friendly" manner, would be a real advantage to the user.

In general, there has been no known universal technique to view all text or data in the computer previously entered over a long period of time, such as an eight hour period, regardless of the program or programs used. However, a technique for accomplishing same, would be highly desirable.

Consequently, it would be highly desirable to have a video monitoring system wherein:

1. Information that has scrolled off the computer screen could be instantly recallable and viewable, without disturbing the present information on the computer screen;

2. Side-by-side displays could be made of two documents, or of two sections of the same document for any software program;

3. All information previously entered over a given interval of time, could be retrieved and displayed much more quickly and easily than most prior known computers and programs allow;

4. The computer could be left unattended while a program is run, and all entered information produced by the program, could later be quickly and easily reviewable after program completion, including all information scrolled off the top of the display:

5. The computer user could be able to view a document exactly as it is formatted on the printed page, before starting the time consuming task of printing the document, so that adjustments in page breaks or other last minute editing can be achieved prior to printing;

6. The user could be able to manually control both fine positioning and rapid scrolling with equal ease of all previously entered information, in either direction;

7. A computer operator, while learning the operation of a computer or computer program, could recall easily all questions and responses that appeared on the display screen, to facilitate the user's recollection of what was displayed previously; and 8. All of the foregoing features should be obtainable, regardless of the specific program or programs previously run over a given interval of time.

SUMMARY OF THE INVENTION

Therefore, the principal object of the present invention is to provide a new and improved auxiliary viewing system, which is adapted to be used with a computer processor unit, which overcomes each one of the foregoing problems, and which is relatively inexpensive to manufacture.

It is another object to provide such a system that enables more convenient and rapid review of previously entered information, regardless of the application program used to enter the information.

Briefly, the above and further objects of the present invention are realized by providing a computer auxiliary viewing system, which enables a rapid review of previously entered information, in a similar manner to the retrieval of information using a microfiche reader. In this regard, by the simple manual turning of a control knob, all previously entered data can be scrolled for review on a screen.

The system includes videographics generating devices responsive to stored information signals in buffer devices for causing the reproduction of the desired scrolling image, and control devices for retrieving selectively the stored information signals in the buffer devices to cause the generation of the image signals by an auxiliary monitor device, independently of information signals being transferred from the input device to the computer processor unit.

Thus, this invention provides a device which allows a computer user to view text or data files on a display screen, such as a screen of an auxiliary display monitor, with rapid access to any part of the text or data. The device also functions as a printer buffer.

A single control element in the form of a control knob, is manually manipulatable to enable information to be viewed, in a page-by-page format. The image of the information being viewed, moves at a speed in synchronism with the rotation of the knob. Slow movement of the knob causes a slow rate of scrolling, and spinning the knob at a high rate of speed causes a very rapid rate of scrolling. But, the scroll rate always corresponds closely to the knob rotation rate.

Also, the scrolling image also accelerates and decelerates at the same rate, and in synchronism with, the axial rotation of the knob. The direction of scrolling also corresponds to the direction of rotation of the knob. In the disclosed form of the invention, the previously entered information can be viewed at any time, without doing anything other than rotating the knob.

This invention represents the first time that computer information has been retrievable in the manner of a microfiche reader. In this regard, smooth scrolling is controlled by the knob, and can be accelerated rapidly to a high rate of speed, and then abruptly stopped and then advanced slowly, line-by-line. All of this is caused under the direct control of a single manually rotatable knob. The effect created by the inventive system, is that the movement of the knob directly drives mechanically an imaginary drum bearing the information on its periphery, and thus, the drum can be rotated freely by the knob being turned by the user.

A software accelerator causes the rate of scrolling to vary according to the rate of knob rotation. Thus, scrolling can be varied smoothly from zero up to a blinding speed, where the information appears to be a blur. The knob can be stopped abruptly to enable careful viewing of a particular segment of interest by rotating the knob slowing in either direction to advance the image line-by-line.

Thus, the system of this invention overcomes the foregoing-mentioned problems associated with prior arrangements. It is easier to read data that extends beyond one display screen. Scrolling is not limited to one line of text at a time. Information can be reviewed without printer paper waste. Selected segments can be printed out irrespective of the computer program being used. Portions of two separate documents can be reviewed simultaneously, and correlation of diagnostic information is possible without making a printed listing. Error messages can be quickly and conveniently recalled, and novice computer operators can recall the commands typed or prompts given. In addition, problems associated with finding desired sections of text received on-line from a modem, are overcome with the system of this invention, without resort to the cumbersome editing programs common to telecommunications software.

In short, the system of this invention provides a new, universal apparatus and technique for reviewing all text and data generated over a period of time on a personal computer, by the activation of a single control element, at any desired time, even while information is being entered into the computer processor unit or an applications program is executing.

BRIEF DESCRIPTION OF THE DRAWINGS

The above and further objects and features of this invention, and the manner of attaining them will become apparent, and the invention itself will be best understood, by reference to the following description of an embodiment of the invention, taken in conjunction with the accompanying drawings, wherein:

FIG. 3A is a timing diagram for signals from the rotary control in FIG. 2.

DETAILED DESCRIPTION

Figure 1:
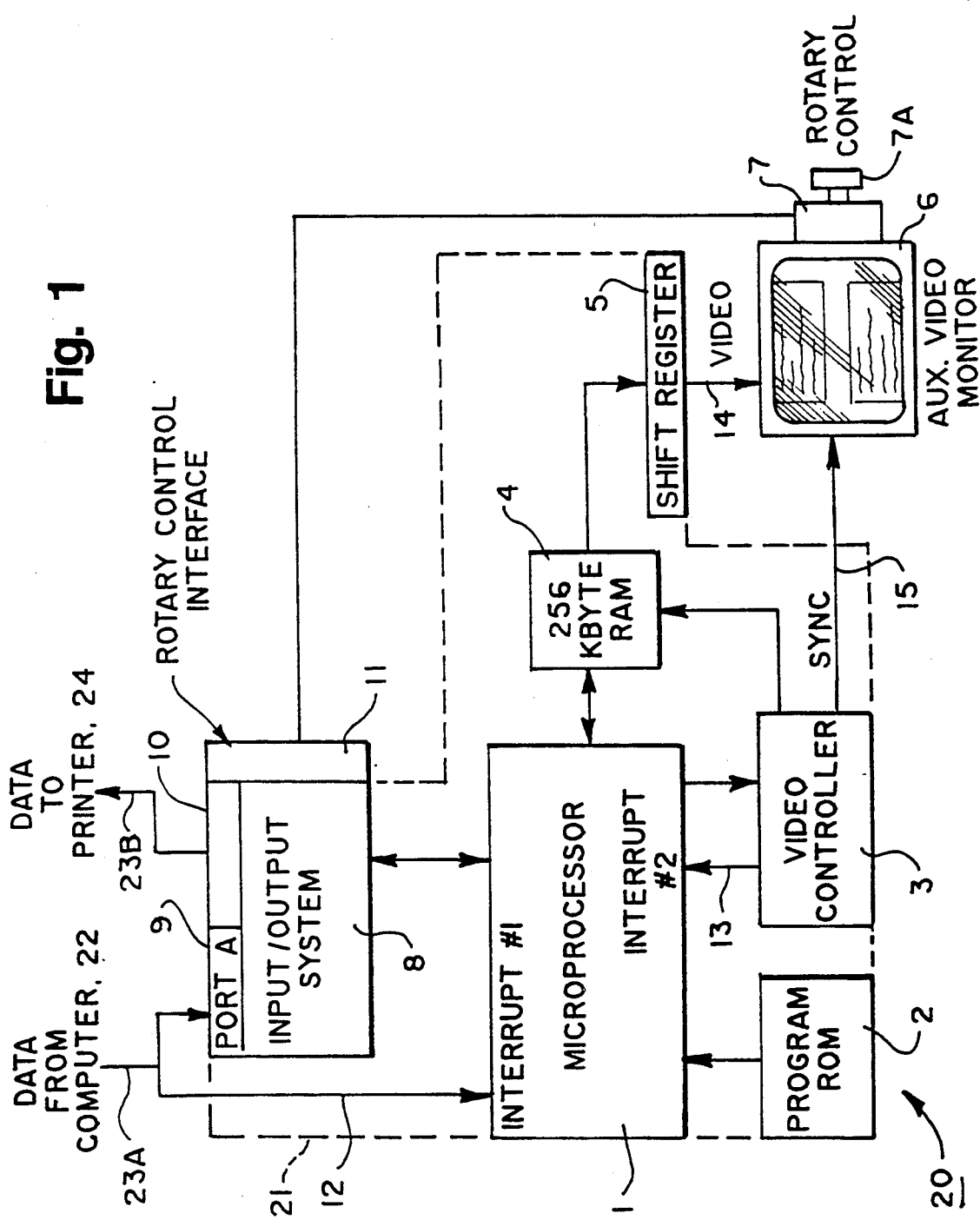
FIG. 1 is a block diagram of a computer auxiliary viewing system, constructed according to the invention.
Figure 1A:
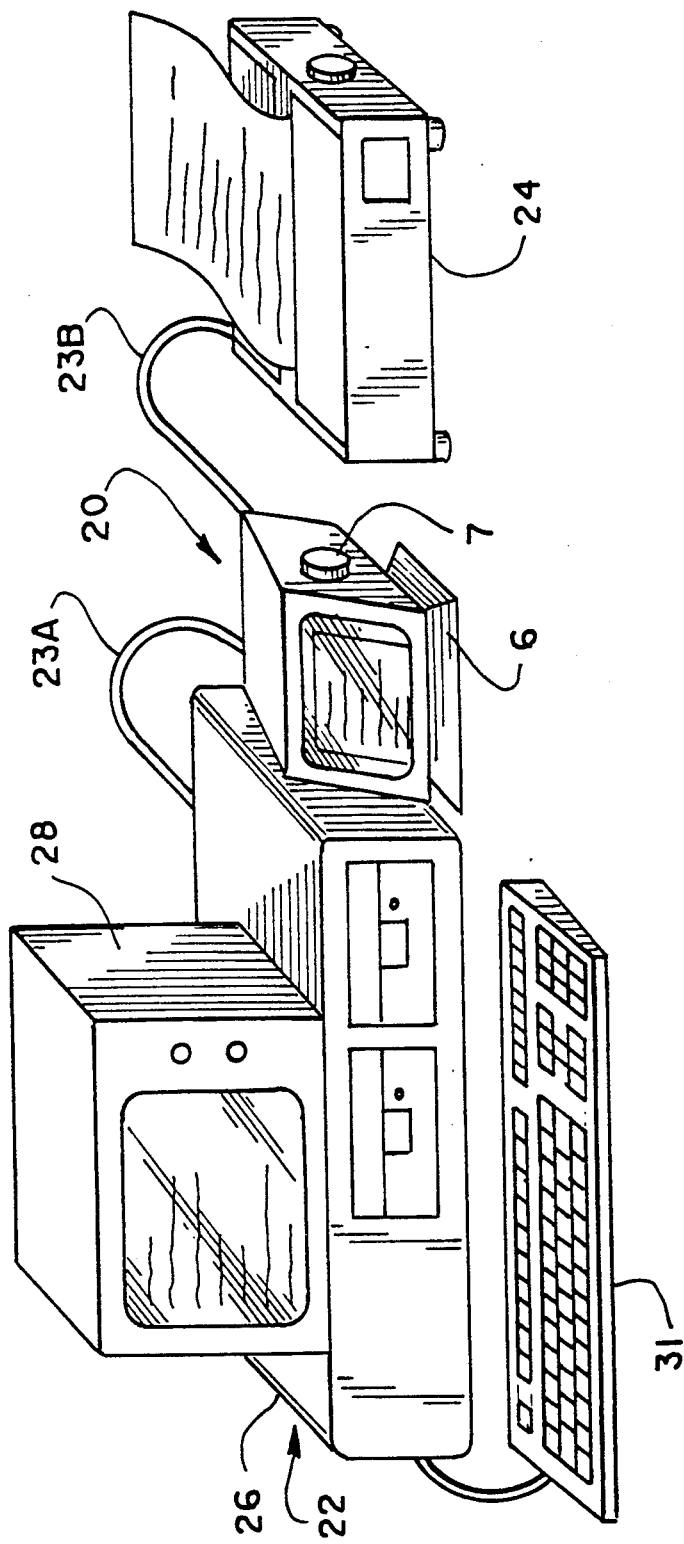
FIG. 1A is a pictorial, partly schematic, view of the system of FIG. 1.

Referring now to FIGS. 1 and 1A of the drawings, there is shown a computer auxiliary viewing system 20, which is constructed according to the present invention.

The system 20 is adapted to be used with a conventional personal computer 22 (FIG. 1A).

The system 20 generally comprises an auxiliary video monitor 6 to display selected computer-generated information, and a rotary control 7 for driving a rotary control interface 11, causes scrolling of information to appear on the monitor 6, under the control of a display control 21. The system 20 is hereinafter sometimes alternatively referred to as a "auxiliary view system".

The video monitor used with the system 20, may be the video display unit of a conventional personal computer, or a separate video monitor, such as an auxiliary monitor 6 dedicated to use with the system 20.

The rotary control 7 is used to control the display of computer-generated information on the video monitor 6. The rotary control 7 is a conventional rotary control and rotary shaft encoder device, such as the photo-optic rotary digitizer manufactured by Hewlett-Packard. It has a conventional knob 7A attached to enable manual rotational control, the knob 7A being turned by hand in the manner of a microfiche reader control knob to control the display of computer-generated information on the video monitor unit 6.

The interface 11 generates control signals indicative of control knob rotational speed and direction, as shown in FIG. 3A. The rotary control interface 11 generates control signals, which are used to control the display of information previously entered by the personal computer, according to the rotation of a manually rotatable control knob 7A of the control 7.

The display control 21 receives information signals from the personal computer 22, sends signals to a printer 24, and provides the necessary control functions to interface the video monitor 6, control 7, and rotary control interface 11 with the computer 22 and printer 24.

The computer 22 may be an IBM personal computer, which includes a computer processing unit 26 to which data and commands may be entered by a keyboard 31. A personal computer display 28 enables viewing computer-generated information. The printer 24 is included as a conventional hard copy output device.

As shown in FIG. 1A, a cable 23A and a cable 23B interconnect the system 20 with the computer processing unit 26 and the printer 24, respectively. The system 20 receives information from the computer processing unit 26 via cable 23A for storage therein and, when desired, for display on the video monitor 6, while cable 23B interconnects the printer 24 so that hard copy can be printed in the usual manner, as well as from the system 20.

Referring now to FIG. 1, display control 21 causes the desired display of scrolled information on the auxiliary video monitor 6 and includes the components contained within the dashed line and includes an input/output system 8, which receives information signals from the computer 22 via the cable 23A and a computer port 9, and transmits information signals to the printer 24 from a printer port 10 via the cable 23B. The display control 21 also includes, as best seen in FIG. 1, a read only memory 2, a video controller 3, a random access memory 4 and a shift register 5.

The input/output system 8 communicates with a microprocessor 1, forming a part of the control 21, which, further includes a read only memory 2, a video controller 3, a random access memory 4, and a shift register 5, to cause the desired display of scrolled information on the monitor 6.

Figure 2:
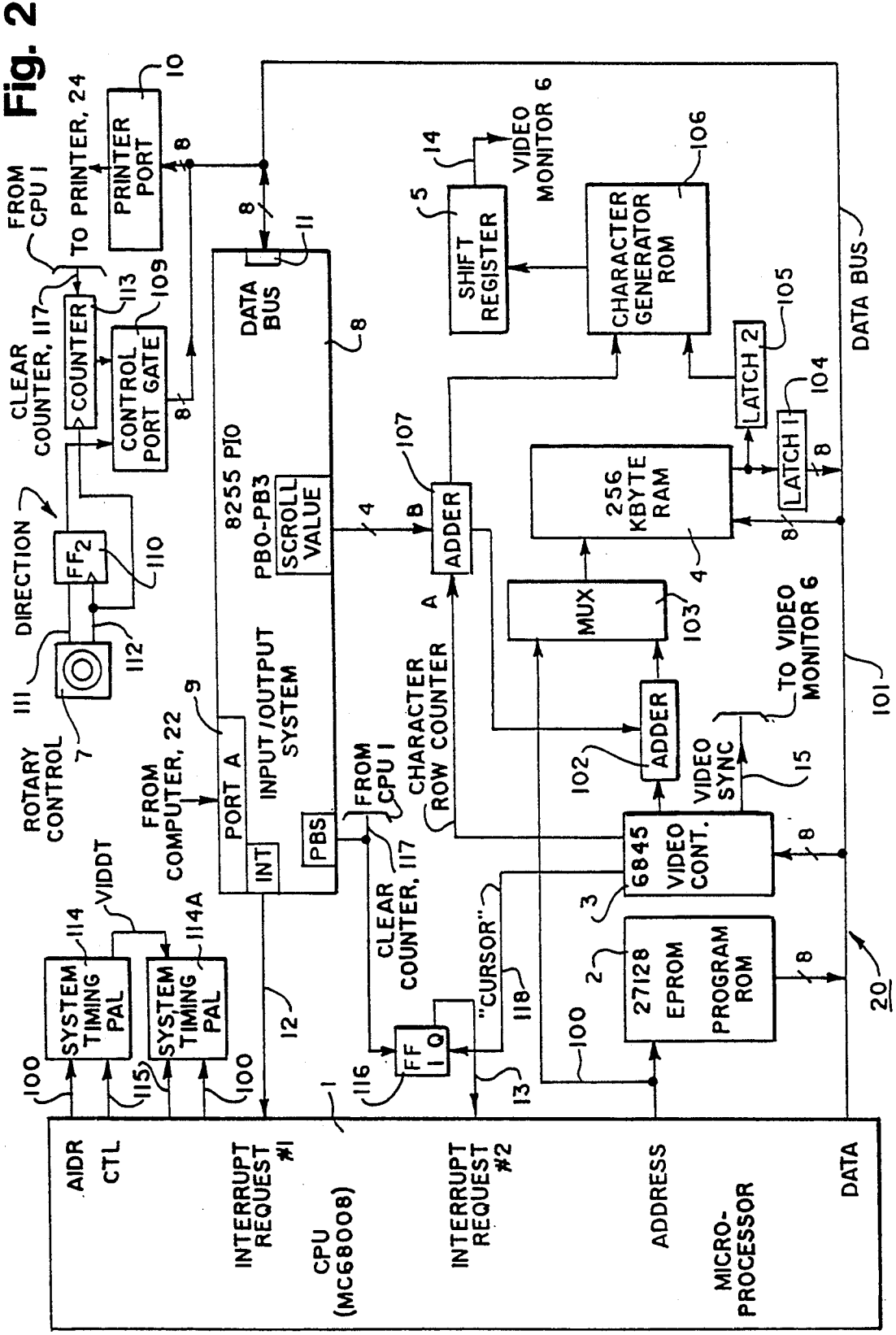
FIG. 2 is a detailed symbolic block diagram of the system of FIG. 1.

Referring now to FIG. 2, as disclosed herein, various components of the system 20 are "TTL devices", which are general purpose logic elements described in catalogs from many semiconductor vendors, a typical one being the Texas Instruments Publication "The TTL Data Book, Volume 2", Library of Congress No. 83-51810. The microprocessor 1 is an MC68008, available from Motorola, Inc. and other manufacturers. It is described in Motorola publications ADI-939-R1, "MC68008 16-Bit Microprocessor With 8-Bit Data Bus" and "M68000 Programmer's Reference Manual", Library of Congress Catalog Card No. 83-62991.

The MC68008 possesses the following attributes: large memory space (up to 1 megabyte), efficient interrupt system, high processing speed, and low cost.

The read only memory 2 sometimes referred to as the "PROGRAM ROM" contains the computer program for the system 20 which is hereinafter described in greater detail, and is set forth in the hereinbelow Table C.

A video controller 3 is a programmable device that provides timing signals to the video monitor 6, and video address information signals to the random access memory 4. The video controller 3 is a HD6845S integrated circuit, manufactured by Hitachi, Ltd, Tokyo Japan, and described in Hitachi Publication #U70, "Hitachi 8/16-Bit Microcomputer Data Book", pages 444-484.

Except for the smooth-scroll capability to be described later, the HD6845S integrated circuit is implemented as a video controller in a manner similar to the methods described in the Hitachi publication, "HD46505R Users Manual". It is initialized by the software program stored in the read only memory 2, and the code for doing so is shown in Table C. Lines 3540-3690 of the code shown in Table C, are copied and stored in a RAM portion (not shown) of the video controller 3, and the program for doing this is shown at line 3410 and following lines.

The random access memory 4 serves to provide the following:

1. system stack for microprocessor 1 to handle subroutine calls and interrupts;
2. scratchpad memory for the microprocessor 1 to store temporary variables;
3. buffer memory to store characters received from the computer processing unit 26 through the port 9; and
4. video display memory, which is repeatedly accessed by the video controller 3 to present a display 60 times per second on the auxiliary video monitor 6.

The random access memory 4 consists of eight, 256 kilobyte dynamic random access memory integrated circuits, available from Hitachi, Ltd. and other manufacturers, and described in numerous semiconductor data books, for example Hitachi's "IC Memories Data Book". The Hitachi part number for the circuit is HM50257-12, which is described on pages 208 through 214 of the data book.

Although this implementation of the system 20 uses 256 kilobytes of storage, the capacity of the memory can be expanded to any practical limit. The random access memory 4 is shared between the microprocessor 1 and the video controller 3. It is time-multiplexed so that the video monitor 6 and microprocessor 1, have equal access opportunity to the memory.

A typical access cycle for the memory system 4 consists of two halves. In the first half of the cycle, the memory 4 is addressed by the video controller 3. During this time, the next character to be displayed is read and sent to the video shift register 5 for clocking out as the video signal to the monitor 6.

In the second half of the cycle, the memory 4 is accessed by the microprocessor 1, during which time the microprocessor 1 can read or write data to the memory. This arbitration technique allows very rapid access to the memory 4 by the microprocessor 1, which access is required in the system to produce a stable, non-flickering display as the information is scrolled.

An input/output sub-system 8 generally comprises the input port 9 which receives printer information signals from the computer processing unit 26, an output port 10 which sends information signals to the printer 24, and the rotary control interface 11 which receives signals from the rotary control 7 and other system control signals.

Figure 1B:
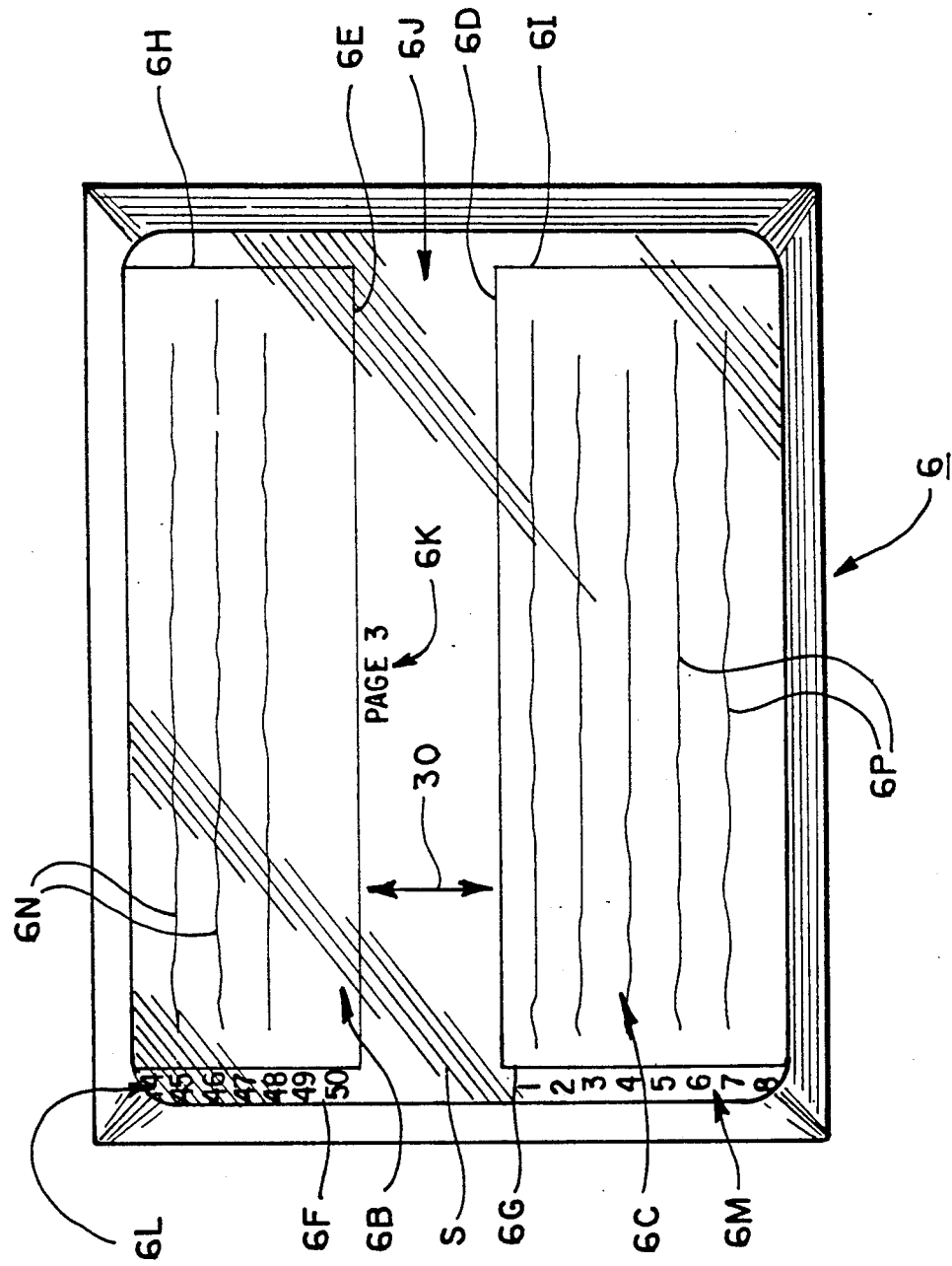
FIG. 1B is an enlarged face view of a video monitor screen showing images of pages of information being scrolled.

Scrolling is illustrated schematically in FIG. 1B. A screen 8 of the monitor 6 displays an image 6A of scrolling information previously entered in the computer processing unit 26 by means of the keyboard 31. The system 20 enables scrolling in either direction (up or down), as depicted by arrow 30. Sideways scrolling could also be accomplished.

Images of pages of text or data, previously entered in computer 22, are displayed. Images 6D and 6E of respective top and bottom margin edges, as well as images 6F and 6G of left margin edges and images 6H and 6I of right margin edges, are displayed so that a user can examine page formatting.

A space 6J between the bottom and top margin edge images 6E and 6D indicates a physical separation between the page images 6B and 6C. In the space 6J, there is a page number image 6K, which is disposed closely adjacent to the bottom margin edge image 6E, to designate the page number for the page image 6B. Each page images has a unique, sequential page number image associated with it.

Images 6L and 6M of a column of line numbers are each disposed to the left of the left margin edge images 6F and 6G, respectively, to provide line number indicia for the text or data images 6N and 6P appearing "on" the respective pages 6B and 6C.

It should be understood that other information or control images (not shown) may also be displayed in the space, such as the space 6J, outside of the page images. Such information images could, for example, include a cursor image.

A "smooth scroll" feature is included. As the user scrolls through the page images to review information stored in the system 20, it is desirable to have the line images of text move smoothly up and down the display, rather than jumping one line of text at a time. The smooth motion produces a more pleasing effect, and also makes it easier to read text as it is moving on the screen.

Scrolling one text line at a time is sometimes referred to as "jump scrolling", since the lines of text appear to jump from one line to the next. Scrolling one display raster line at a time is referred to as "smooth scrolling", and is the method used in the system 20.

Figure 3:
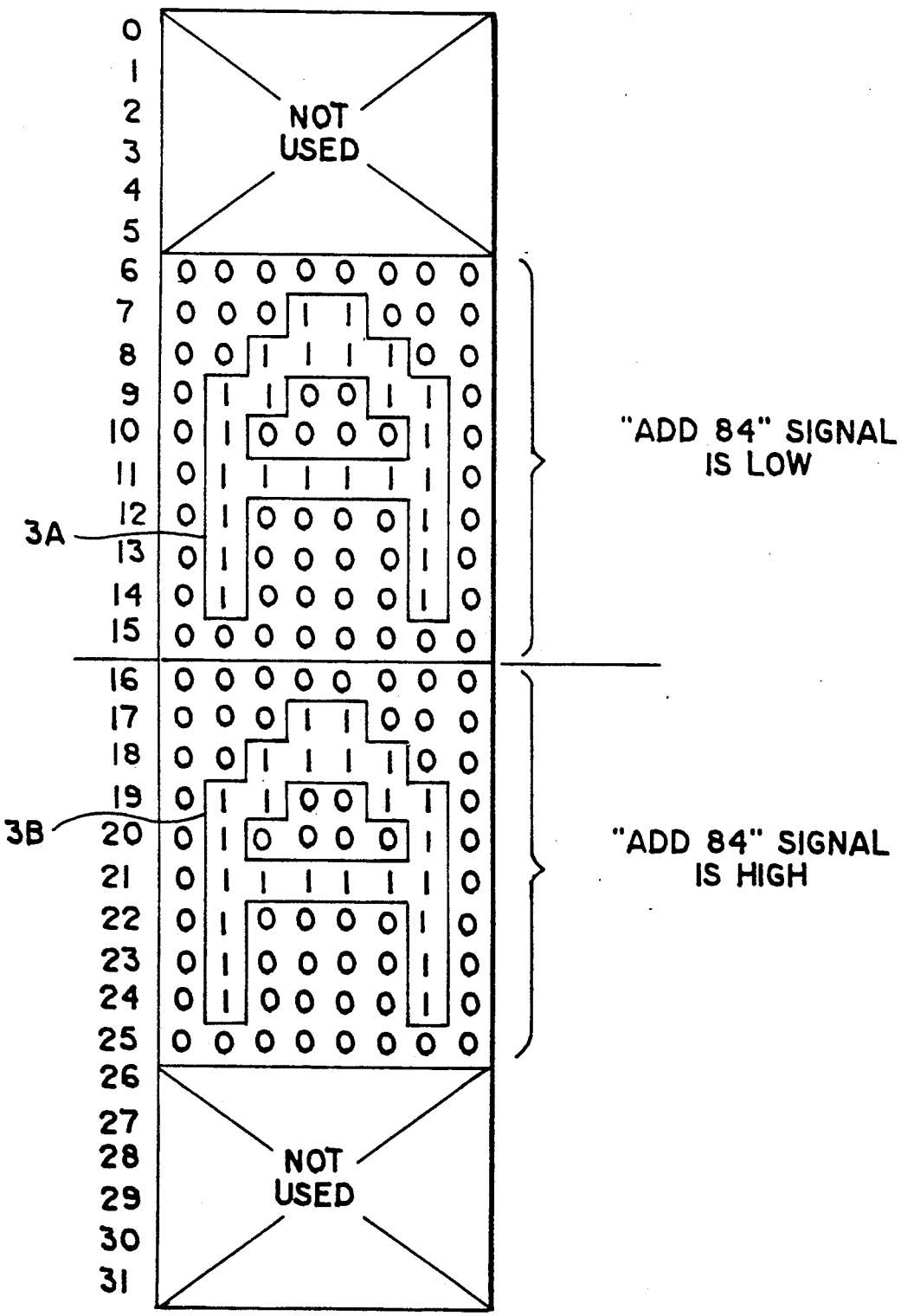
FIG. 3 is a chart, illustrating details of character generation and scrolling.

As shown in FIG. 3, the system 20 display character images, such as a pair of character images 3A and 3B disposed one above the other. Each character image includes a grid of dots images, 8 wide and 10 high on the monitor screen. If desired, this 10 line resolution can be varied. A FIG. "A" is shown in FIG. 3 for both of the character images 3A and 3B. With jump scrolling, any vertical scroll operation moves a line of text images up or down 10 raster lines on the display. With smooth scrolling, a vertical scroll operation moves a line of text only one raster line at a time, or one-tenth the distance of a jump scroll operation. This small movement increment provides the smooth scroll operation with its smooth appearance.

As shown in FIG. 2, the video controller 3 is capable of jump scroll operation only. In order to add to provide the smooth scrolling feature, an adder 102, an adder 107, and a specially formatted character generator read only memory 106 are provided.

The system 20 displays 25 lines of text, with each line capable of displaying 84 characters. Of the 84 characters, 80 are used for text and 2 on each side are used for displaying the page margin edge images and the line number images or other special editing symbol images or the like.

The first adder 102, which is a 10-bit adder constructed from three 74LS283 TTL integrated circuits, adds the constant 84 to the video address from the video controller 3 at selected times, and thus causes the forcing of memory access to one text line lower (higher in memory), than the text line being selected by the video controller 3. When not adding 84, the constant 0 is added, which leaves the video controller 5 addresses unaffected.

The command signal to add 84 comes from the adder 107, a 4-bit adder which is a 74LS283 TTL integrated circuit. The 74LS283 device takes two four bit numbers A and B, and produces a sum S on four output pins. The A input of the adder 107 is provided by the character row counter from the video controller, which specifies which scan line inside of the display character is currently being displayed. In this application, the row counter address always cycles between 0 and 9.

The B input of the adder 107 is provided by four output bits from the programmable input output system 8. These bits are set by the microprocessor 1 to provide the raster line scroll value The value set by the microprocessor 1 to scroll a given number of raster lines (N) is given in the following table:

| To Scroll N Raster Lines | The Microprocessor Sets This Value |
| --- | --- |
| 0 | 6 |
| 1 | 7 |
| 2 | 8 |
| 3 | 9 |
| 4 | 10 |
| 5 | 11 |
| 6 | 12 |
| 7 | 13 |
| 8 | 14 |
| 9 | 15 |

The adder 107 has a carry output, which goes HIGH when the result of the addition of A and B is greater than 15. This carry output forms the signal to the adders 102, which causes them to add 84 to the displayed line address. An example will illustrate how this function is performed.

Assume first that the scroll value from the microprocessor 1 is 6, indicating that no scrolling is to take place (0 raster lines). The line address from the video controller 5 counts from 0 to 9, to which 6 is added by adder 13, producing row addresses to the character generator read only memory 106 from 6 to 15. The carry from the adder 107 never goes HIGH, since the count of 15 is never exceeded. Thus, the adder 102 adds 0 to the row address, and the display appears exactly as if the adder were not present.

Now suppose that the scroll value from the microprocessor 1, is 7, indicating that the display is to move one raster line upwardly. Again, the line addresses from the video controller 5 count from 0 to 9, to which 7 is added by adder 107. The first selected row of the character is now 7, which is one raster line lower than the previous case. As the video controller row address counts from 1 to 9, the selected row in the character generator memory 106 advances from 8 to 15. The characters thus appear to move one raster line upward.

When the tenth and last line of the text character is addressed, the adder 107 produces a sum of 0 and a carry output. The carry output causes the adders 102 to add 84 to the line address, thus accessing the next line down in the video memory. This preserves the one raster line scrolling requirement through line boundaries.

In a like manner, increasing values of B provided by the microprocessor 1 cause the displayed character to be accessed further down in memory and thus appear to move upward on the display.

To account for this special addressing, the character generator memory 106 requires a special format. For a given 8 by 10 dot character, such as the FIG. "A" in FIG. 3, two 16 byte areas are used. One or the other of these 16-byte areas is selected by the "ADD 84" signal previously described.

When "ADD 84" is low, the character generator memory 106 uses the first set of 16 bytes for the character, where the display bits are stored in bytes 6 through 15 (to match the preceding table).

When the "ADD 84" signal is high, indicating that one line of text lower is being displayed, the second 16 byte area is accessed, where the display bits are stored in bytes 0 through 9. This addressing accounts for the fact that the adder 107 starts at 0 when the carry bit is set, indicating that a character is to be read from one line lower in the display memory.

FIG. 3 shows how the character generator memory 106 data is organized for the display character "A", the top "A" 3A being bottom justified and the bottom "A" 3B being top justified. In this regard, alternate rows of characters are bottom and top justified.

In addition to the standard alphanumeric character set, the character generator memory 106 contains special graphic symbols, which are used to show the page boundaries and other special symbols. A total of 256 characters are available in this implementation. More characters could be implemented by adding bits to the random access memory 4.

The character resolution can be varied to more or less than the illustrated 10 line resolution by utilizing the five unused lines. In this regard, as shown in FIG. 3, the bottom justified character 3A is formed in lines 6 through 15, and can be expanded in height in the unused lines 0 through 5 above the line 6. Similarly, the top justified characters of the next line, such as the character 3B, occupy lines 16 through 25, and can be expanded in height in the unused lines 26 through 31.

Consider next system timing. Timing signals for the system are provided by a pair of programmable logic array (PAL) devices 114 and 114A, as described in the "LSI Databook (Sixth Edition)" from Monolythic Memories, Santa Clara, Calif. The outputs (not shown) from the PAL devices 114 and 114A are supplied to various sub-systems of the system 20. The various interconnections the control signals have been omitted for sake of clarity. The PAL device 114 uses the microprocessor clock signals CLK, A19, A18 (address lines A19 and A18), and data strobe signal DS to generate the following timing signals! RAS (row address strobe) and CAS (column address strobe) control the read and write operations of the dynamic random access memories. SRL (shift register load) pulses low to load video information from the random access memory 4 to the video shift register 5. The shift register, in turn, provides an output signal at 14 and supplies it to the input of the monitor 6.

A signal CCLK, is a clock signal for the video controller 3, which advances its internal counters (not shown) to the next display character.

A MUX multiplexor signal is a control signal for the address multiplexor 103, which switches addresses to the random access memory, between the microprocessor 1 and the video controller 3.

The signal VDTACK (video data transfer acknowledge) goes to the second PAL device 114A to synchronize data transfers between the random access memory 4, and the microprocessor 1.

Table A gives the Boolean logic equations for the first PAL device at 114, used to program it by using a conventional device (not shown) programmer, available from Data I/O Corporation, Washington, and other manufacturers.

TABLE A

Logic Equations for First PAL Device 114

Q3 := (/Q0 * Q3
    + /RAS * Q3
    + CCLK * Q3
    + /A18 * A19 * /DS *
        /DTACK * Q0 * RAS * /CCLK * /Q3)
CCLK := (/Q0 * CCLK
    + /RAS * CCLK
    + Q0 * RAS * /CCLK
    + Q0 * RAS * /CCLK * /Q3)
RAS := (/Q0 * RAS + Q0 * /RAS)
Q0 := (/Q0)
MUX := (/RAS * /CCLK * Q3 + RAS * CCLK * Q3)
CAS := (RAS * /CCLK + RAS * Q3)
DTACK := (/A18 * A19 * /DS * DTACK + /Q0 * RAS
    * /CCLK * Q3)
SRL := (/Q0 + /CCLK + RAS)

NOTE: ":=" means registered output, "*" means logical AND, "+" means logical OR, "/" means logical NOT. The first PAL device is a 16RP8 or equivalent.
NOTE: Q3 is an internal signal, not used by the system.
NOTE: Q0 is an internal signal, not used by the system.

The second PAL device 114A, receives the following signals from the microprocessor 1:
address lines A19, A1B, and A17,
AS (address strobe),
DS (data strobe), and
RD (read).

In addition, the second PAL device 114A receives the VIDDT signal from the first PAL device 114.

Table B shows the logic equations for the second PAL 114A.

TABLE B

Logic Equations for Second PAL Device 114A

NOTE: "*" means logical AND, "+" means logical OR, "/" means logical NOT). The second PAL is a PAL 16P8 or equivalent.
```
CSROM = /(/A17 * /A18 * /A19 * /AS)
LATCH = /(A17 * /A18 * /A19 * /AS * /RD)
LRD   = /(A17 * /A18 * /A19 * /AS * RD)
IOWR  = /(/A17 * A18 * /A19 * /AS * /RD)
IORD  = /(/A17 * A18 * /A19 * /AS * RD)
E6845 = /(/A17 + /A18 + A19 + DS + RD)
DTACK = /(VIDDT
        + /A17 * A18 * /A19 * /AS
        + A17 * /A18 * /A19 * /AS
        + A17 * A18 * /A19 * /DS
        + /A17 * /A18 * /A19 * /AS * ROMDTEN)
RAMRD = /(/A18 * A19 * /AS * RD)
```

According to the logic equations shown in Table B, the second PAL device supplies the following output signals:

SROM is a chip select signal for the ROM memory 2, that becomes LOW when the ROM memory is accessed by the microprocessor 1.

A IORD (IO-Read) signal and IOWR (IO-Write) signal are read and write pulses which are pulsed LOW when the 8255 Input/Output system 8 is accessed by the microprocessor 1.

A RAMRD (RAM Read) signal is LOW when the microprocessor 1 reads data from the random access memory system 4.

A LATCH signal is LOW when the microprocessor 1 sends output data to the printer port 10.

An LRD (latch read) signal is low when the microprocessor 1 reads data from the control port 16.

A E6845 signal (enable 6845 video controller data transfer) is HIGH when the microprocessor 1 writes data to the 6845 video controller 3.

A DTACK signal (data transfer acknowledge) is connected to the DTACK input pin of the microprocessor. The signal DTACK is low whenever data has been transferred to or from the microprocessor data bus 101 by any of the external devices.

Considering now the input/output system 8, the system 8 is an 8255 programmable input output (PIO) integrated circuit, manufactured by Intel Corp, Santa Clara, Calif., and other manufacturers, and described in the Intel publication, "Peripheral Design Handbook", Publication Number AFN-01300C-1, pages 1-333 through 1-353.

The 8255 circuit has many operating modes, described in the foregoing-mentioned reference. The system 20 uses the following 8255 configuration:

Port A is in the latched input mode (8255 Mode 1) to implement the proper control signals required for data transfer between a computer's printer output port and the system 20;

Port B is used in the programmed output mode (8255 Mode 0) and the port B output pins are used in various parts of the system:

1. Port B bits 0, 1, 2 and 3 are supplied to adder 107 to select the scroll value, 2. Port B bit 5 is used to reset the video interrupt flipflop 116, and reset the rotary control counter 113, 3. Port B bits 4, 6 and 7 are available for general purpose output use such as system indicator lights; and Port C supplies "handshake" signals for port A (bits 3-6), and general purpose input and output signals (bits 0-2,6,7), which are assigned as follows:

bit 7: an output signal, used to generate the printer STROBE pulse, bit 6: an output signal, used to generate the computer ACK (acknowledge) pulse signal, bit 5: an output signal, which is HIGH when data has been latched into the port A input register, is LOW when the microprocessor 1 reads the data, and is the BUSY signal for the external computer's printer port, bit 4: input, used to strobe data into the port A input register. This is the STB signal from the external computer.

bit 3: output, which goes HIGH when data has been loaded into the port A input register, and goes LOW when the microprocessor 1 reads the data value. This pin serves as an interrupt request signal to the microprocessor, and is shown as signal 12 in FIG. 2.

bit 2: general purpose input, available for auxiliary control input.

bit 1: general purpose input, available for auxiliary control input.

bit 0: an input signal, used to detect the BUSY signal from the external printer.

The protocol for sending parallel (8-bit) data from a computer to a printer is well known, and is usually referred to as the so-called "Centronics Standard", which calls for the following signals:

1. Eight data lines,

2. A strobe (STB) signal sent by the computer 22 to the printer to indicate that the data is valid, 3. An ACK (acknowledge) signal sent from the printer to the computer 22 to indicate that the last data byte was accepted and stored by the printer 24, and 4. A BUSY line from the printer 24 returned back to the computer 22 to indicate when the printer is not able to receive data.

This protocol is emulated on the computer port 9, so that the system appears to the external computer 22 to be a standard parallel interface printer (albeit a very fast one).

Likewise, the printer port 10 sends signals using the "Centronics Standard" protocol to an external printer 24. Thus, unique control is provided. Once the text data or information has entered the system from the external computer 22, it is available for scrolling by the user. The single control knob 7A of the rotary control 7 is manipulated by the user to control the scroll direction and rate, at any time, without the need to enter any other scroll initiating signals.

While a single rotary control knob is preferred, it will become apparent to those skilled in the art after becoming familiar with the present invention, that other scroll initiating techniques may also be employed and are within the time spirit and scope of the present invention. For example, two pushbuttons (not shown) could serve as "scroll up" and "scroll down" input control buttons. This method has the drawback that the user has no control over scroll rate. It is set by the microprocessor 1.

There are times that a very slow scroll rate is desired (fine-positioning a page on the display screen), and there are times that a very rapid scroll rate is desired (scrolling between entire pages to find a particular section in the text).

Thus, the two button approach could be slightly improved by adding "fast" and "slow" buttons (not shown) for each direction, giving the user two scroll speeds.

Another control approach is a lever with a return to center spring (not shown). The lever is pushed forward to scroll up, and pulled back to scroll down. If attached to a linear transducer (not shown) such as a potentiometer, the scroll rate can be increased as the lever is moved further from its center position.

The main disadvantage to the lever approach is that the computer, rather than the operator, controls the instantaneous scroll rate (a disadvantage shared with the pushbutton approach). This makes it difficult to make small adjustments to the position of the text on the screen. For example, to scroll one raster line (one-tenth the distance of a displayed line of text) requires a very slight movement of a linear control, which is easily exceeded as the lever is moved from its center position.

An additional disadvantage to having the microprocessor 1, rather than the operator, control the scroll rate (even with many different possible rates) is that some people find the moving display to cause nausea especially at certain rates. For example, three raster lines at a time seems to create physical discomfort for the person viewing the display screen. Thus, the direct manual control achieved by the single control knob 7A, provides a more direct means of control where the user feels that the observed scroll rate is exactly the rate expected by the user at all times.

The single control knob allows the operator to scroll the screen in continuously variable increments, ranging from very small (a raster line at a time) to very large (a page at a time). To accomplish this, the control knob effectively controls the scroll position for small scroll increments, and rate for large scroll increments. Additionally, the control knob 7A provides control of the scroll over a full control range, by a single, simple control.

The accomplishes this by means of free-spinning rotary control 7. The control 7 is weighted with a circular mass (not shown) which serves as a flywheel. A ball-bearing system (not shown) insures low rotational friction. The control 7 can be rotated as slowly as the operator wishes, for small scroll increments, or spun rapidly and left to free-wheel, for very rapid scroll increments.

The rapid rate can be accelerated even further by a software technique, to be described later. Once the control is spinning, the control can be abruptly stopped by simply grabbing the control knob and forcefully stopping it from rotating.

The rotary control 7 a conventional device, and is equipped with a shaft encoding system (not shown) which provides two logic pulse signals every N degrees of rotation. For this purpose a slotted disk (not shown) is mounted on the control shaft (not shown), and two light emitting diode emitters (not shown) are positioned on one side of the disk, facing two light sensors (not shown) on the other side of the disk. The slotted disk with N slots produces a pulse every 360 degrees divided by N.

Two emitter/detector pairs are positioned such that one's light path is blocked by a "non-slot" when the other's is facing a slot thus, the direction of rotation can be determined by using a flipflop 110, shown in FIG. 2. The flipflop is a TTL type 74LS74 and is supplied with input direction signal 111 and speed signal 112 that are generated by rotary control 7, as illustrated in FIG. 3A.

The two detector signals from the rotary control 7 are out of phase with each other. If the rising edge of signal 112 occurs when signal 111 is HIGH, the control is rotating in one direction; if the rising edge of 112 occurs when signal 111 is low, the control is rotating in the opposite direction. The flipflop 110 output thus serves as a rotation direction signal, and is connected to an input port gate 109, of the microprocessor 1.

Additionally, signal 112 causes a counter 113 to advance, indicating how fast the control is rotating. This counter is read by the microprocessor 1 via the control port gate 109, every 16.6 milliseconds, and is reset immediately after it is read, via the signal CLEAR COUNTER 117 received from the microprocessor. The counter value thus indicates the number of pulses produced by the control every 16.6 milliseconds.

Two interrupts are used by the microprocessor 1 in the system 20. The microprocessor 1 provides a prioritized interrupt system, to control which interrupt is to be serviced when two interrupt requests are pending. The system 20 thus categorizes it's two interrupt sources as "high-priority" and "low-priority".

The high-priority interrupt in the system is signal 12 from the input/output system 8 which indicates that a character has been sent from the computer 22 to the "printer" (the computer treats the system 20 as a printer). This interrupt technique maximizes the transfer rate from the computer 22 to the system 20, and thus delays the computer as little as possible.

The low-priority interrupt comes from flipflop 116, which is set by the video controller 3, and reset by the "PB5" signal of the input/output system 8. The flipflop output signal 13 serves as the microprocessor low-priority interrupt request.

The intended use for signal 13 is to request an interrupt every vertical blanking interval of the display monitor 6 in FIG. 1. During this blanking interval, which lasts approximately 2 milliseconds, the display's cathode ray tube is turned off, while the beam traverses from the lower right corner of the CRT screen, to the upper left corner thereof, in preparation for sweeping out another field (picture).

During this blanking interval, the microprocessor 1 computes the next picture to be displayed (based on the last portion of text shown and the scroll increment desired by the operator), and moves the new display information into the display memory portion of the random access memory 4. By performing this update operation during vertical blanking, the operator sees a stable picture without any letters changing as the display memory is updated.

The microprocessor 1 performs multiple functions in the 2 millisecond interval, the final part of which is to do the actual memory move of data into the display memory. In order to have sufficient time to permit the microprocessor to perform its tasks, a signal identified as "CURSOR" from the video controller 3, occurs some time before the commencement of the "vertical blank". Thus, microprocessor 1 is interrupted and begins processing earlier than the blanking interval, giving the microprocessor more time than is available in the vertical blanking interval to complete the required operations.

The "CURSOR" signal is provided by using the CURSOR output of the video controller 3 to set the interrupt request flipflop 116. The CURSOR output is intended to cause the display a cursor on the screen. Since the system 20 does not use a cursor, this signal is available for alternate use as the signal "CURSOR".

The microprocessor 1 can control where the cursor appears on the CRT screen by writing data to two registers in the video controller 3 The value written to these registers thus controls the time of the "vertical blank" interrupt, which for this application is set to the lower right corner of the display, a spot that is swept by the CRT beam just before vertical blanking.

SOFTWARE

Consider now the software program for the system 20. The software is divided into three sections:

Routine #1: an interrupt service routine to accept a character from the external computer 22 (Table C listing lines 2260-2760);

Routine #2: an interrupt service routine to (Table C listing lines 2790-3390) update the display every VSYNC interval. This routine can be interrupted by Routine #1 (Table C listing lines 2790-3390); and Routine #3: a background program to initialize the viewer and send stored data to the printer 24 (Table C listing lines other than those mentioned above). This routine can be interrupted by Routines #1 and #2.

When a character is sent from the computer 22 to the system 20, the high-priority interrupt is activated, which passes control to Routine #1. This routine stores the character in the buffer portion of the random access memory 4, and advances an address register which points to the next available storage location Every 16.6 milliseconds (VSYNC time), the low-priority interrupt passes control to Routine #2. This routine does the following:

1. reads the count value from the rotary control counter 113;
2. reads the rotary control direction bit from flipflop 110,
3. calculates the new scroll value and writes it to the scroll bits of the input/output system 8 which, in turn, supplies the new scroll value to the scroll Adder 107; and
4. moves the desired display data from the input buffer (loaded by Routine #1) to the display memory portion of memory 4.

Routine #2 maintains an "active display" pointer in an address register, which always indicates the top of the memory section to be copied into the display memory. Every VBLANK interval, 1398 bytes are transferred from the buffer memory to the display memory. As the operator moves the rotary control 7, this pointer moves up and down through the buffer memory.

Routine #2 contains special code that implements an automatic "control accelerator" function. This function enables the system operator to cause an even faster scroll rate than that provided by the free-spinning knob rotating at its maximum rate. For this purpose, a certain maximum knob spin rate is sensed, and above this rate, an alternate encoding system is switched to, so that in effect more pulses per degree rotation are produced than the standard encoding system produces.

The observed effect to the operator is that if the knob 7A is spun very rapidly, the scroll rate accelerates dramatically over the rate that would normally be chosen by the direct coupling of the knob to the system 20. As the control decelerates below the maximum spin rate, the normal scroll rate then takes place.

To use a mechanical analogy, above a certain rotation speed, the knob is geared down to produce effectively more pulses per degree of rotation. This effect is achieved in the Routine #2 by monitoring the rate of rotation of the control knob, and comparing it with a reference rate of 15 pulses, (line 2970 of the program in the following Table C). The reference rate is a spin rate above which the operator desires the display to scroll more rapidly than the rate called for by the rotary control 7.

If this reference value is exceeded, the program increases the scroll value indicated by the spinning knob by a predetermined amount.

Routine #3 checks for data in the buffer memory, and if the printer 24 is ready (not BUSY), sends another character to the printer 24. An optional PAUSE button (not shown) can be checked to cause the suspension of this operation, and a COPY button (not shown) can cause the printing of multiple copies.

The following Table C shows microprocessor source and object code for these three routines.

```
Table C:   Microprocessor Source and Object Code
                    1030  *-------------------------------
                    1040  * Input/Output Assignments
                    1050  *-------------------------------
00040000-           1060  PORTA   .EQ     $40000      ; 8255
00040001-           1070  PORTB   .EQ     PORTA+1
00040002-           1080  PORTC   .EQ     PORTB+1
00040003-           1090  MODE    .EQ     PORTC+1
                    1100  *-------------------------------
00060000-           1110  CRTREG  .EQ     $60000      ; 6845
00060001-           1120  CRTDAT  .EQ     CRTREG+1
00020000-           1130  CTR     .EQ     $20000
                    1140  *-------------------------------
                    1150  * Input/Output
                    1160  *-------------------------------
                    1170  * Port C: input
                    1180  *         2: Control Interrupt pend
                    1190  *         1: VSYNC
                    1200  *         0: Control Direction
                    1210  *-------------------------------
                    1220  * Port B: output
```

```
                          1230 *      6: reset control irq ff
                          1240 *      5: reset VIDEO irq ff
                          1250 *      2-0: smooth scroll count
                          1260 *----------------------------------
00001000- 6100 01B2       1270         BSR      SETUP
                          1280 *----------------------------------
00001004- 13FC 00B1
00001008- 0004 0003       1290         MOVE.B   #$B1,MODE
0000100C- 13FC 0006
00001010- 0004 0001       1300         MOVE.B   #6,PORTB
                          1310 *----------------------------------
                          1320 * Initialize the buffer memory by
                          1330 * writing the graphic character
                          1340 * symbols for top, sides and
                          1350 * bottom of the page.
                          1360 *
                          1370 * Assume a page length of 66
                          1380 * text lines, with 80 characters
                          1390 * per page.
                          1400 *----------------------------------
00001014- 207C 0008
00001018- 08DC            1410         MOVE.L   #$808DC,A0
0000101A- 323C 0001       1420         MOVE     #1,D1      ; PAGES
0000101E- 343C 0041       1430 NUPG    MOVE     #65,D2     ; LINES
                          1440 *----------------------------------
                          1450 * Top line graphics
                          1460 *----------------------------------
                          1470 * NOTE: Upper left corner  = $83
                          1480 *       Upper right corner = $84
                          1490 *       Top of page        = $81
                          1500 *       Left & right sides = $80
                          1510 *       Lower left corner  = $85
                          1520 *       Lower right corner = $86
                          1530 *----------------------------------
00001022- 10FC 0083       1540 TOP     MOVE.B   #$83,(A0)+
00001026- 303C 0051       1550         MOVE     #81,D0
0000102A- 10FC 0081       1560 .2      MOVE.B   #$81,(A0)+
0000102E- 51C8 FFFA       1570         DBF      D0,.2
00001032- 10FC 0084       1580         MOVE.B   #$84,(A0)+
                          1590 *----------------------------------
                          1600 * 66 lines of left/right margins
                          1610 *----------------------------------
00001036- 10FC 0080       1620 TEXT1   MOVE.B   #$80,(A0)+ ; left
0000103A- 303C 0051       1630         MOVE     #81,D0
0000103E- 10FC 0020       1640 .1      MOVE.B   #$20,(A0)+ ; 82 bk
00001042- 51C8 FFFA       1650         DBF      D0,.1
00001046- 10FC 0080       1660         MOVE.B   #$80,(A0)+ ; right
0000104A- 51CA FFEA       1670         DBF      D2,TEXT1
                          1680 *----------------------------------
                          1690 * Bottom graphic
                          1700 *----------------------------------
0000104E- 10FC 0085       1710 BOT     MOVE.B   #$85,(A0)+
00001052- 303C 0051       1720         MOVE     #81,D0
00001056- 10FC 0082       1730 .1      MOVE.B   #$82,(A0)+ ; bottom
0000105A- 51C8 FFFA       1740         DBF      D0,.1
0000105E- 10FC 0086       1750         MOVE.B   #$86,(A0)+
```

```
00001062- 303C 00A7  1760           MOVE     #167,D0
00001066- 10FC 0020  1770 .2        MOVE.B   #$20,(A0)+
0000106A- 51C8 FFFA  1780           DBF      D0,.2
                     1790 *------------------------------------
                     1800 * Write "Page n" between pages
                     1810 *------------------------------------
0000106E- 217C 5061
00001072- 6765 FFA2  1820           MOVE.L   #$50616765,-94(A0)
00001076- 1801       1830           MOVE.B   D1,D4
00001078- 0604 0030  1840           ADD.B    #$30,D4
0000107C- 1144 FFA7  1850           MOVE.B   D4,-89(A0)
00001080- 5241       1860           ADDQ     #1,D1
00001082- 0C41 0028  1870           CMP      #40,D1
00001086- 6D96       1880           BLT      NUPG
                     1890 *------------------------------------
                     1900 * A2 is display pointer, A0 is
                     1910 * buffer pointer, A3 is printer
                     1920 * data pointer.
                     1930 *
                     1940 * Start buffer one page + 2 chars
                     1950 * down from display pointer.
                     1960 * ($80932)
                     1970 *------------------------------------
00001088- 247C 0008
0000108C- 08DC       1980           MOVE.L   #$808DC,A2
0000108E- 207C 0008
00001092- 0932       1990           MOVE.L   #$80932,A0
00001094- 2648       2000           MOVE.L   A0,A3
00001096- 4243       2010           CLR      D3      ; TIMER
00001098- 1E3C 0006  2020           MOVE.B   #6,D7   ;LINE CT
                     2030 *------------------------------------
                     2040 * Remove CLR from INT flip-flops
                     2050 *------------------------------------
0000109C- 08F9 0006
000010A0- 0004 0001  2060           BSET     #6,PORTB ;CRT
000010A4- 08F9 0005
000010A8- 0004 0001  2070           BSET     #5,PORTB ;CONTROL
000010AC- 1A39 0004
000010B0- 0000       2080           MOVE.B   PORTA,D5 ; DUMMY
                     2090 *------------------------------------
                     2100 * Bset port C bit 4
                     2110 *------------------------------------
000010B2- 13FC 0009
000010B6- 0004 0003  2120           MOVE.B   #$09,MODE
                     2130 *------------------------------------
                     2140 * Enable interrupts (all)
                     2150 *------------------------------------
000010BA- 027C F8FF  2160           ANDI     #$F8FF,SR
                     2170 *------------------------------------
                     2180 * BACKGROUND PROGRAM: code goes
                     2190 * here to send a character to
                     2200 * the printer if there is data to
                     2210 * send (A0 n.e. A3) and the
                     2220 * printer is ready.
                     2230 *------------------------------------
000010BE- 60FE       2240 SPIN      BRA      SPIN
```

```
                    2250 *----------------------------------
                    2260 COMPUTER.INT
                    2270 *----------------------------------
                    2280 * Computer interrupt:
                    2290 *
                    2300 * Computer has sent a character
                    2310 * to the "printer" (me)
                    2320 *----------------------------------
000010C0- 1A39 0004
000010C4- 0000      2330        MOVE.B   PORTA,D5
000010C6- 0C05 0008 2340        CMP.B    #$08,D5   ;rubout?
000010CA- 6600 000A 2350        BNE      .2        ; no
                    2360 *----------------------------------
                    2370 * It's a rubout.  Erase the last
                    2380 * symbol and bump the write
                    2390 * pointer back one position.
                    2400 *----------------------------------
000010CE- 10BC 0020 2410        MOVE.B   #$20,(A0)
000010D2- 5388      2420        SUBQ.L   #1,A0
000010D4- 4E73      2430        RTE
                    2440 *----------------------------------
                    2450 * It's not a rubout.  New page?
                    2460 *----------------------------------
000010D6- 0C05 000D 2470 .2     CMP.B    #13,D5    ; CR?
000010DA- 6700 000E 2480        BEQ      NULINE
000010DE- 0C05 000A 2490        CMP.B    #10,D5    ; LF?
000010E2- 6700 0004 2500        BEQ      .1
                    2510 *----------------------------------
                    2520 * Not new page.  Write character
                    2530 * to buffer and exit
                    2540 *----------------------------------
000010E6- 10C5      2550        MOVE.B   D5,(A0)+
000010E8- 4E73      2560 .1     RTE
                    2570 *----------------------------------
                    2580 * New page. Advance write pointer
                    2590 * (A0) to left margin of next
                    2600 * line.
                    2610 *----------------------------------
000010EA- 91FC 0008
000010EE- 0000      2620 NULINE SUB.L    #$80000,A0
000010F0- 2C08      2630        MOVE.L   A0,D6
000010F2- 8CFC 0054 2640        DIVU     #84,D6
000010F6- 4846      2650        SWAP     D6
000010F8- 90C6      2660        SUB      D6,A0
000010FA- D0FC 0056 2670        ADD      #86,A0
000010FE- D1FC 0008
00001102- 0000      2680        ADD.L    #$80000,A0
00001104- 0C10 0082 2690        CMP.B    #$82,(A0) ;new pg?
00001108- 6600 0008 2700        BNE      .2        ; no
                    2710 *----------------------------------
                    2720 * It's a new page.  Advance A0 to
                    2730 * over graphic page break on scrn
                    2740 *----------------------------------
0000110C- D1FC 0000
00001110- 0150      2750        ADD.L    #336,A0   ; yes
00001112- 4E73      2760 .2     RTE
```

```
                        2770 *----------------------------------
                        2780 *----------------------------------
                        2790        VSYNC.INT
                        2800 *----------------------------------
                        2810 * It's VBLANK time. (every 16.6
                        2820 * milliseconds).  Update the
                        2830 * smooth scroll registers & copy
                        2840 * desired buffer memory into
                        2850 * display memory.
                        2860 *----------------------------------
00001114- 1639 0002
00001118- 0000          2870        MOVE.B    $20000,D3
                        2880 *----------------------------------
                        2890 * Read the knob counter and reset
                        2900 * the IRQ and knob counter
                        2910 *----------------------------------
0000111A- 08B9 0005
0000111E- 0004 0001     2920        BCLR      #5,PORTB
00001122- 08F9 0005
00001126- 0004 0001     2930        BSET      #5,PORTB
0000112A- 0203 003F     2940        AND.B     #$3F,D3
0000112E- 0883 0005     2950        BCLR      #5,D3    ;direction?
00001132- 6600 0014     2960        BNE       CCW
                        2970 *----------------------------------
                        2980 * Apply speedup if count is
                        2990 * greater than 15.
                        3000 *----------------------------------
00001136- 0C43 000F     3010        CMP       #15,D3
0000113A- 6D00 0006     3020        BLT       .1
0000113E- 0643 0014     3030        ADD       #20,D3   ; speedup
00001142- DE03          3040 .1     ADD.B     D3,D7
00001144- 6000 0010     3050        BRA       CHECK
00001148- 0C43 000F     3060 CCW    CMP       #15,D3
0000114C- 6D00 0006     3070        BLT       .1
00001150- 0603 0014     3080        ADD.B     #20,D3   ; speedup
00001154- 9E03          3090 .1     SUB.B     D3,D7
                        3100 *----------------------------------
00001156- 0C07 000F     3110 CHECK  CMP.B     #15,D7
0000115A- 6F00 000E     3120        BLE       .1
0000115E- D5FC 0000
00001162- 0054          3130        ADD.L     #84,A2
00001164- 0447 000A     3140        SUB       #10,D7
00001168- 60EC          3150        BRA       CHECK    ; again
0000116A- 0C07 0006     3160 .1     CMP.B     #6,D7
0000116E- 6C00 000E     3170        BGE       LIMIT
00001172- 95FC 0000
00001176- 0054          3180        SUB.L     #84,A2
00001178- 0647 000A     3190        ADD       #10,D7
0000117C- 60EC          3200        BRA       .1       ; again
                        3210 *----------------------------------
                        3220 * Check for limit (beginning)
                        3230 *----------------------------------
0000117E- B5FC 0008
00001182- 08DC          3240 LIMIT  CMPA.L    #$808DC,A2
00001184- 6C00 000C     3250        BGE       MOVIT
00001188- 247C 0008
```

```
0000118C- 08DC            3260                MOVE.L    #$808DC,A2
0000118E- 3E3C 0006       3270                MOVE      #6,D7
                          3280    *----------------------------------
                          3290    * Move new data into display
                          3300    *----------------------------------
00001192- 0239 00F0
00001196- 0004 0001       3310    MOVIT  ANDI.B    #$F0,PORTB
0000119A- 8F39 0004
0000119E- 0001            3320           OR.B      D7,PORTB
                          3330    *----------------------------------
000011A0- 284A            3340           MOVE.L    A2,A4        ; SRC
000011A2- 2A7C 000B
000011A6- 0000            3350           MOVE.L    #$80000,A5   ;DST
000011A8- 343C 0222       3360           MOVE      #546,D2
000011AC- 2ADC            3370    XFR    MOVE.L    (A4)+,(A5)+
000011AE- 51CA FFFC       3380           DBF       D2,XFR
000011B2- 4E73            3390    VX     RTE
                          3400    *----------------------------------
                          3410    * Setup routine initializes the
                          3420    * 6845 CRT controller chip,
                          3430    * using the values in TABLE.
                          3440    *----------------------------------
000011B4- 307C 11D0       3450    SETUP  MOVE      #TABLE,A0
000011B8- 4241            3460           CLR       D1
000011BA- 13C1 0006
000011BE- 0000            3470    LOOP   MOVE.B    D1,CRTREG
000011C0- 13D8 0006
000011C4- 0001            3480           MOVE.B    (A0)+,CRTDAT ;VAL
000011C6- 5241            3490           ADDQ      #1,D1
000011C8- 0C41 0010       3500           CMP       #$10,D1
000011CC- 66EC            3510           BNE       LOOP
000011CE- 4E75            3520           RTS
                          3530    *----------------------------------
000011D0- 69              3540    TABLE  .DA       #105   ;HT-1
000011D1- 54              3550    HD     .DA       #84    ;HD
000011D2- 5B              3560           .DA       #91    ;HS-1
000011D3- AA              3570           .DA       #$AA   ;SWIDTH
000011D4- 19              3580           .DA       #25    ;VT-1
000011D5- 02              3590           .DA       #2     ;VTA
000011D6- 19              3600           .DA       #25    ;VDISP
000011D7- 19              3610           .DA       #25    ;VS-1
000011D8- 20              3620           .DA       #$20   ;MODE
000011D9- 09              3630           .DA       #9     ;CHAR HT-1
000011DA- 09              3640           .DA       #9     ;CSTART
000011DB- 09              3650           .DA       #9     ;CEND
000011DC- 00              3660           .DA       #0
000011DD- 00              3670           .DA       #0
000011DE- 08              3680           .DA       #$08   ; CUR-h
000011DF- 33              3690           .DA       #$33   ; CUR-1
                          3700    *----------------------------------
                          3710           .OR       $868   ; Autovec 2
00000868- 0000 1114       3720           .DA       VSYNC.INT
                          3730           .OR       $874   ; Autovec 5
00000874- 0000 10C0       3740           .DA       COMPUTER.INT
                          3750           .OR       $87C   ; Autovec 7
0000087C- 0000 10C0       3760           .DA       COMPUTER.INT
```

Thus, this invention provides an auxiliary video monitor system for displaying computer-generated information that employs a video monitor unit on which to display selected computer-generated information, and a manually rotatable control knob with which to control display of the information. A rotary shaft encoder device generates a control signal indicative of control knob rotational speed and direction, and a display control arrangement responsive to the control signal causes selected computer-generated information to be displayed on the video monitor unit in accordance with control knob rotation.

A single control element in the form of a knob is used to cause information to appear page-by-page on the monitor at a speed corresponding to the rate of knob rotation. And this is the first time that computer information has been retrievable like that of a microfiche reader.

While a particular embodiment of the present invention has been shown and described herein, it will become apparent to those skilled in the art that many changes and modifications may be made in the form, construction, and arrangement of the procedures and parts described herein, without departing from the true spirit and scope of the present invention.

For example, in place of a separate monitor, it will become apparent to those skilled in the art, after reviewing the foregoing disclosure, to utilize the computer monitor 28 as the display for the information retrievable by the system 20 of the present invention, by either displaying a separate screen thereby, or by using "window" or split screen displays. In this manner, two different screens of information can be combined into one, by switching automatically, in response to movement of a knob, from the computer screen to the auxiliary screen of viewing information, and back again, when a switch (not shown) is closed, or a predetermined time elapses.

Also, it is contemplated that not only side-to-side scrolling may be accomplished with the system of the present invention, but also, a second knob may be provided, if desired, for independent control of such lateral scrolling operations.

In addition the following modifications and additions are contemplated:

1. a "Stop on Feature" mode to allow spinning the control knob for rapid scrolling, and having the microprocessor 1 automatically stop the scrolling when a certain feature, such as a page break, a certain word, a phrase, etc. is encountered in the buffer.

2. a place marker pushbutton (not shown). To mark your place in a document, and scroll to another part of the document, whereby pressing the button a second time causes an immediate return to the marked place;

b 3. making the control knob assembly a detachable unit that rests on the user's work surface, next to the computer keyboard to allow the system 20 to be disposed in a variety of locations, such as behind the computer 22, between the computer and its monitor, or in the computer 22 itself as a plug-in card;

4. a portable version, using a flat panel display; and 5. adding a removable non-volatile memory cartridge for text storage. Whereby in an office environment, one system could be dedicated to a printer at a noise-controlled site, and text could be collected for printing from several installations.

Therefore, the invention is intended to be limited only by the following appended claims.

What is claimed is:

1. A computer auxiliary viewing system for an associated computer system having a computer central processing unit, a video monitor and input means for entering information in the associated computer system, comprising:

auxiliary monitoring means for generating scrolling image signals indicative of information signals entered by the input means for visual display purposes;

means for receiving the information signals entered from the input means for visual display purposes;

buffer means for storing said received information signals;

a manually rotatable control knob for controlling the display of information signals entered by the input means for visual display purposes on said auxiliary monitoring means;

rotary shaft encoder means for generating knob displacement control signals indicative of control knob rotational displacement;

means responsive to the knob displacement control signals for generating knob speed control signals indicative of the angular sped of said knob;

means responsive to said signals indicative of the angular speed of said knob for causing the image scrolling rate to be accelerated when the angular speed of said knob is greater than a predetermined rate;

means responsive to said knob speed signals for scrolling said information images displayed on said auxiliary monitoring means at a given scrolling rate; and said given scrolling rate corresponding to either the angular speed and direction of rotation of said control knob when the angular speed of said knob is less than said predetermined rate or an accelerated scrolling rate when the angular speed of said knob is greater than said predetermined rate in response to said means for causing the image scrolling rate to be accelerated, said accelerated scrolling rate being greater than the angular speed of said knob.

2. A system according to claim 1, further including:

memory means for storing a control program; and computer means responsive to said control program for storing information in said buffer means to cause the scrolling image signals to produce images of page boundaries surrounding the displayed information signals entered by said input means.

3. A system according to claim 2, wherein said computer means responds to said program information to store line number image information in said buffer means to permit said scrolling image signals to produce images indicative of line numbers opposite the reproduced images of lines of displayed information signals outside of said produced images of page boundaries.

4. A system according to claim 1, wherein said buffer means stores all signals generated by the computer processing unit to enable any portion of said information to be reviewed selectively on the auxiliary monitoring means.

5. A system according to claim 1, further comprising:

a printer for printing information displayed on said auxiliary monitoring means, said printer having an input port;

an input port adapted to be connected to the output of said computer central processing unit;

an output port adapted to be connected to the input port of said printer; and control means for initiating the printing of information displayed on said auxiliary monitor means by said printer.

6. A system according to claim 1, further including computer means for responding to said program information to store page number image information in said buffer means to cause page number information to be produced adjacent the other information images being displayed.

7. A system according to claim 1, further including computer means for responding to said program information and to said stored information for generating groups of character image information signals indicative of alternating rows of top and bottom justified characters with unused-information signals arranged below and above the respective ones of said top and bottom justified characters to permit the height of the characters to be adjusted, said computer means responsive to said image information signals indicative of said alternating rows of characters for causing the production of equally spaced apart images of said characters.

8. An auxiliary video monitor system for a central processing unit having input means and a video monitor for displaying computer-generated information, comprising:

a manually rotatable control knob for controlling the display of computer-generated information on the video monitor;

rotary shaft encoder means for generating knob displacement control signals indicative of control knob rotational displacement;

means responsive to the knob displacement control signals for generating signals indicative of the angular speed of said knob;

means responsive to said signals indicative of the angular speed of said knob for causing the image scrolling rate to be accelerated when the angular speed of said knob is greater than a predetermined rate;

means responsive to said knob speed signals for scrolling said information images displayed on said video monitor at a given scrolling rate; and said given scrolling rate corresponding to either the angular speed and direction or rotational of said control knob or an accelerated scrolling rate corresponding to the angular direction of said control knob, said accelerated scrolling rate being greater than the angular speed of said knob.

9. A system as recited in claim 8, wherein the scrolling means includes:

smooth scrolling means for causing lines of information displayed on the video monitor unit to scroll in increments of a raster line width.

10. A system as recited in claim 8, wherein the scrolling means includes:

memory map means for displaying characters according to alternating memory map blocks of rows of top and bottom justified character images.

11. A system as recited in claim 8, further comprising:

software accelerator means for causing the rate of scrolling on the video monitor unit to accelerate relative to the rate of rotation of the knob.

12. A system as recited in claim 11, further comprising means for sustaining the rate of scrolling on the auxiliary monitoring means for a predetermined period of time relative to the rate of rotation of said control knob.

13. A system as recited in claim 8, further comprising cursor signal interrupt means for initiating scrolling updates.

14. An auxiliary video monitor system according to claim 8, further comprising:

means for monitoring the rate of change of the angular speed of the knob to generate signals indicative of the rate of change of angular speed of the knob; and means responsive to said signals indicative of the rate of change of the angular speed of the knob for controlling the rate of change of angular speed of scrolling of the information displayed on the monitor for synchronizing purposes.

15. A method for displaying computer-generated information comprising:

using a video monitor unit on which to display selected computer-generated information, and a manually rotatable control knob for controlling the display of computer-generated information on said video monitor unit;

generating a control signals indicative of the angular speed and direction of said control knob;

causing the image scrolling rate to be accelerated when the angular speed of said knob is greater than a predetermined rate; and scrolling said information images displayed on said video monitor unit at a given scrolling rate, said given scrolling rate corresponding to either the angular speed and direction of rotation of said control knob when the angular speed of the knob is less than said predetermined rate or an accelerated scrolling rate when the angular speed of said control knob is greater than said predetermined rate, said accelerated scrolling rate being greater than the angular speed of said knob.

16. A method according to claim 15, further including accelerating the rate of scrolling to a certain high rate of speed when said control means rotates at a speed higher than a predetermined rate, said predetermined rate being slower in speed than said high rate.

17. A method according to claim 16, wherein said control means includes a knob.

18. A method according to claim 16, further including arranging signals indicative of rows of top and bottom justified characters of information in alternating rows.

* * * * *

UNITED STATES PATENT AND TRADEMARK OFFICE
CERTIFICATE OF CORRECTION

PATENT NO. : 5,179,648

DATED : January 12, 1993

INVENTOR(S) : Lane T. Hauck

It is certified that error appears in the above-identified patent and that said Letters Patent is hereby corrected as shown below: Column 28, Line 26, after "angular", delete "sped", and substitute therefor--speed--.

Column 29, Line 48, After "direction", delete "or rotational and substitute therefor--of rotation--.

Signed and Sealed this

Ninth Day of November, 1993

Attest:

BRUCE LEHMAN

Attesting Officer     Commissioner of Patents and Trademarks